United States Patent
Shimura et al.

(10) Patent No.: US 9,624,402 B2
(45) Date of Patent: Apr. 18, 2017

(54) NON-AQUEOUS INKJET PRINTING METHOD

(71) Applicant: RISO KAGAKU CORPORATION, Tokyo (JP)

(72) Inventors: Shinichiro Shimura, Ibaraki (JP); Teruaki Okawa, Ibaraki (JP); Toshihiro Endo, Ibaraki (JP); Tetsuo Hosoya, Ibaraki (JP); Naoyuki Torita, Ibaraki (JP); Hikaru Sugiura, Ibaraki (JP); Hiroshi Hayashi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 89 days.

(21) Appl. No.: 14/574,816

(22) Filed: Dec. 18, 2014

(65) Prior Publication Data
US 2015/0184011 A1 Jul. 2, 2015

(30) Foreign Application Priority Data
Dec. 27, 2013 (JP) .................... 2013-272449

(51) Int. Cl.
*B41J 2/21* (2006.01)
*C09D 179/02* (2006.01)
(Continued)

(52) U.S. Cl.
CPC .......... *C09D 179/02* (2013.01); *B41J 2/1631* (2013.01); *C08K 3/04* (2013.01); *C08K 5/06* (2013.01);
(Continued)

(58) Field of Classification Search
CPC ..... B41J 2/01; B41J 2/0057; B41J 2/05; B41J 2/1433; B41J 2/17; B41J 2/1755; B41J 2/17503; B41J 2/17593; B41J 2/21; B41J 2/211; B41J 2/2107; B41J 2/2114; B41J 2/2117; B41J 2/2056; C09D 11/005;
(Continued)

(56) References Cited

U.S. PATENT DOCUMENTS 6,428,143 B2* 8/2002 Irihara .................... B41J 2/2117
347/100
2007/0229585 A1* 10/2007 Komatsu ............ B01J 20/28097
347/31
(Continued)

FOREIGN PATENT DOCUMENTS

| JP | 2010-1452 A | 1/2010 |
| JP | 2011-98454 A | 5/2011 |
| JP | 2012-161981 A | 8/2012 |

*Primary Examiner* — Manish S Shah
(74) *Attorney, Agent, or Firm* — Greenblum & Bernstein, P.L.C.

(57) ABSTRACT

The method is a non-aqueous inkjet printing method including the steps of: ejecting droplets of a non-aqueous pigment ink containing at least a pigment and a non-aqueous solvent onto a surface of a printing medium to form dots composed of the non-aqueous pigment ink, and then ejecting droplets of a non-aqueous post-treatment liquid containing at least silica and an organic solvent toward the printing medium so that the droplets overlap with the dots composed of the non-aqueous pigment ink, wherein either of the non-aqueous pigment ink and the post-treatment liquid contains a water-soluble resin having an amino group.

15 Claims, 3 Drawing Sheets

(51) Int. Cl.
  *C08K 3/04* (2006.01)
  *C08K 5/06* (2006.01)
  *C09D 11/106* (2014.01)
  *C09D 11/322* (2014.01)
  *C09D 11/36* (2014.01)
  *C09D 11/54* (2014.01)
  *B41J 2/16* (2006.01)

(52) U.S. Cl.
  CPC .......... *C09D 11/106* (2013.01); *C09D 11/322* (2013.01); *C09D 11/36* (2013.01); *C09D 11/54* (2013.01)

(58) Field of Classification Search
  CPC ....... C09D 11/30; C09D 11/32; C09D 11/322; C09D 11/324; C09D 11/328; C09D 11/36; C09D 11/38; C09D 11/40; C09D 11/52; C09D 11/54; C09D 11/101
  USPC ........................ 347/9–22, 56, 86, 88, 95–105
  See application file for complete search history.

(56) References Cited

U.S. PATENT DOCUMENTS

| | | | |
|---|---|---|---|
| 2008/0011192 A1* | 1/2008 | Uozumi | C09D 11/36 106/31.75 |
| 2009/0220695 A1* | 9/2009 | Oyanagi | B41J 2/2114 427/256 |
| 2010/0190922 A1* | 7/2010 | Shinozaki | C09D 11/38 524/591 |

* cited by examiner

NON-AQUEOUS INKJET PRINTING METHOD

BACKGROUND

Technical Field

The present invention relates to a non-aqueous inkjet printing method in which printing is conducted by using a non-aqueous ink by an inkjet recording system.

Related Art

An inkjet recording system is a printing system in which printing is conducted by injecting a liquid ink having high fluidity from a fine nozzle to allow adhesion of the liquid ink onto a recording medium such as paper. This system has characteristics that this is a relatively inexpensive apparatus, and that a high-quality image having a high resolution can be printed at a high speed with low noises, and thus has been increasingly a part of modern life.

Color materials for inks used for inkjet recording systems are roughly classified into color materials using pigments and color materials using dyes. Among these, inks using pigments as color materials tend to increase since they are excellent in light resistance, weather resistance and water resistance that are required for high image quality printing.

In terms of solvents, inks are roughly classified into aqueous inks and non-aqueous inks. Non-aqueous inks that do not use water as an ink solvent, including solvent-based inks containing a volatile solvent as the main constituent and oil-based inks containing a non-volatile solvent as the main constituent, have gained attention since they have characteristics that they have fine stability on printing machines (intermittent discharge property, discharge restoration property after leaving a long period, and the like), they cause no curl on printing papers, they require a short time for the permeation and drying of the inks, and the like.

However, non-aqueous inks have a problem that the printing density is lowered since color materials easily permeate into printing media. Therefore, in order to improve the printing density, various suggestions have been made (for example, see JP 2010-1452 A). JP 2010-1452 A suggests a non-aqueous pigment ink containing non-aqueous resin dispersion microparticles having pigment dispersibility against an ink solvent. However, when a printing density is increased by the means of JP 2010-1452 A, other performances such as storage stability and ejection stability are deteriorated. Alternatively, it is also possible to increase a printing density by increasing a transfer amount of an ink, but a problem that the surface of a printed product is easily abraded (deterioration of abrasion resistance) occurs.

On the other hand, considerations for increasing a printing density by focusing on not an ink but a print method and devising the method have been made (see JP 2011-98454 A and JP 2012-161981 A). In either of the patent documents, a predetermined treatment liquid is imparted to a recording medium before or after formation of dots by an ink so that the treatment liquid overlaps with the ink during printing, whereby the permeation of the color material in the ink into the recording medium is prevented. JP 2011-98454 A suggests a pre-treatment liquid for a non-aqueous ink and JP 2012-161981 A suggests a post-treatment liquid for a non-aqueous ink, and either of these patent documents aims at improving a printing density.

SUMMARY

However, both of the treatment liquids in JP 2011-98454 A and JP 2012-161981 A are water-based treatment liquids containing water, deterioration of ejection property and shelf performance, or generation of curls is concerned.

Accordingly, it is considered that, if the printing density can be improved even the treatment liquid is non-aqueous, a printing method that is excellent in printing density, ejection property, shelf performance and prevention of curls can be attained.

The present invention has been conceived in view of the above-mentioned conventional problems, and aims at providing a non-aqueous inkjet printing method that can improve the printing density even a non-aqueous post-treatment liquid is used.

The present invention that solves the above-mentioned problem is as follows.

(1) A non-aqueous inkjet printing method including the steps of:

ejecting droplets of a non-aqueous pigment ink containing at least a pigment and a non-aqueous solvent onto a surface of a printing medium to form dots composed of the non-aqueous pigment ink, and then ejecting droplets of a non-aqueous post-treatment liquid containing at least silica and an organic solvent so that the droplets overlap with the dots composed of the non-aqueous pigment ink, wherein either of the non-aqueous pigment ink and the post-treatment liquid contains a water-soluble resin having an amino group.

(2) The non-aqueous inkjet printing method according to (1), wherein the organic solvent in the post-treatment liquid contains a glycol ether-based solvent.

(3) The non-aqueous inkjet printing method according to (1) or (2), wherein plural rows of the dots composed of the non-aqueous pigment ink are formed on the surface of the printing medium, and the post-treatment liquid is then ejected so that the droplets of the post-treatment liquid land on the respective dots of the non-aqueous pigment ink.

(4) The non-aqueous inkjet printing method according to (1) or (2), wherein plural rows of the dots composed of the non-aqueous pigment ink are formed on the surface of the printing medium, and the post-treatment liquid is then ejected so that the droplets of the post-treatment liquid land on the gaps between the adjacent dots of the non-aqueous pigment ink.

According to the present invention, a non-aqueous inkjet printing method that can improve the printing density even a non-aqueous post-treatment liquid is used can be provided.

DETAILED DESCRIPTION

The non-aqueous inkjet printing method of the present invention is a non-aqueous inkjet printing method including the steps of ejecting droplets of a non-aqueous pigment ink containing at least a pigment and a non-aqueous solvent onto a surface of a printing medium to form dots composed of the non-aqueous pigment ink, and then ejecting droplets of a non-aqueous post-treatment liquid containing at least silica and an organic solvent so that the droplets overlap with the dots composed of the non-aqueous pigment ink, wherein either of the non-aqueous pigment ink and the post-treatment liquid contains a water-soluble resin having an amino group.

The present invention intends to suppress the permeation of the pigment into the printing medium to thereby improve the printing density by incorporating the water-soluble resin having a water-soluble resin into the post-treatment liquid while using the non-aqueous post-treatment liquid.

Firstly, the non-aqueous pigment ink and the post-treatment liquid that are used in the non-aqueous inkjet printing method of the present invention will be sequentially explained below.

[Non-Aqueous Pigment Ink]

The non-aqueous pigment ink in the present invention (hereinafter simply referred to as "ink") contains at least a pigment and a non-aqueous solvent, and also contains a water-soluble resin, a pigment dispersant (non-aqueous resin) and the like as necessary.

(Pigment)

As the pigment, organic pigments such as azo pigments, phthalocyanine pigments, polycyclic pigments and dye lake pigments, and inorganic pigments can be used. The azo pigments include soluble azo lake pigments, insoluble azo pigments and condensed azo pigments. The phthalocyanine pigments include metal phthalocyanine pigments and non-metal phthalocyanine pigments. The polycyclic pigments include quinacridone-based pigments, perylene-based pigments, perinone-based pigments, isoindoline-based pigments, isoindolinone-based pigments, dioxadine-based pigments, thioindigo-based pigments, anthraquinone-based pigments, quinophthalone-based pigments, metal complex pigments and diketopyrrolopyrrole (DPP) and the like. Typical inorganic pigments include carbon black and titanium oxide and the like. These pigments may be used singly or in combination of two or more kinds.

The content of the pigment in the non-aqueous pigment ink in the present invention is generally from 0.01 to 20% by mass, and preferably from 1 to 15% by mass, more preferably from 5 to 10% by mass, from the viewpoints of printing density and ink viscosity.

The average particle diameter of the pigment in the non-aqueous pigment ink is preferably 500 nm or less, more preferably 150 nm or less from the viewpoints of dispersibility and storage stability. The average particle diameter of the pigment is a value measured by a laser diffraction type particle diameter distribution measurement device LB-500 manufactured by Horiba, Ltd.

(Non-Aqueous Solvent)

As the non-aqueous solvent, either of a nonpolar organic solvent and a polar organic solvent can be used. These may be used singly, or can be used in combination of two or more kinds as long as a single phase is formed. Preferable examples of the nonpolar organic solvent can include petroleum-based hydrocarbon solvents such as aliphatic hydrocarbon solvents, alicyclic hydrocarbon solvents and aromatic hydrocarbon solvents. Examples of the aliphatic hydrocarbon solvents and alicyclic hydrocarbon solvents may include paraffin-based, isoparaffin-based and naphthene-based solvents. Examples may include those sold under the following trade names. Teclean N-16, Teclean N-20, Teclean N-22, Naphthesol L, Naphthesol M, Naphthesol H, Solvent No. 0-L, Solvent No. 0-M, Solvent No. 0-H, Isozol 300, Isozol 400, AF Solvent No. 4, AF Solvent No. 5, AF Solvent No. 6 and AF Solvent No. 7 (all of these are manufactured by JX Nippon Oil & Energy); Isopar G, Isopar H, Isopar L, Isopar M, Exxsol D40, Exxsol D80, Exxsol D100, Exxsol D130 and Exxsol D140 (all of these are manufactured by Tonen General Sekiyu K.K.). Examples of the aromatic hydrocarbon solvents include Grade Alkene L and Grade Alkene 200P (all of these are manufactured by JX Nippon Oil & Energy), Solvesso 200 (manufactured by Tonen General Sekiyu K.K.) and the like.

Examples of the polar organic solvent can include ester-based solvents, higher alcohol-based solvents, higher aliphatic acid-based solvents and the like. Examples include ester-based solvents having 14 or more carbon atoms in one molecule such as methyl laurylate, isopropyl laurylate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, soybean oil methyl, soybean oil isobutyl, tall oil methyl, tall oil isobutyl, diisopropyl adipate, diisopropyl sebacate, diethyl sebacate, propylene glycol monocaproate, trimethylolpropane tri-2-ethylhexanoate and glyceryl tri-2-ethylhexanoate; higher alcohol-based solvents having 8 or more carbon atoms in one molecule such as isomyristyl alcohol, isopalmityl alcohol, isostearyl alcohol and oleyl alcohol; higher aliphatic acid-based solvents having 9 or more carbon atoms in one molecule such as isononanoic acid, isomyristic acid, hexadecanoic acid, isopalmitic acid, oleic acid and isostearic acid; and the like.

(Pigment Dispersant)

It is preferable to incorporate a pigment dispersant in the non-aqueous pigment ink in the present invention so as to ensure the dispersion stability of the pigment.

The pigment dispersant that can be used in the present invention is not especially limited as long as it is a pigment dispersant that allows stable dispersion of the pigment in a non-aqueous solvent, and for examples, hydroxyl group-containing carboxylic acid esters, salts of long chain polyaminoamides and high molecular weight acid esters, salts of high molecular weight polycarboxylic acids, salts of long chain polyaminoamides and polar acid esters, high molecular weight unsaturated acid esters, copolymerized products of polymers, modified polyurethanes, modified polyacrylates, polyether ester-type anion-based activators, naphthalene sulfonic acid-formalin condensate salts, polyoxyethylene alkyl phosphate esters, polyoxyethylene nonyl phenyl ethers, polyester polyamines, stearylamine acetate the like are preferably used, and among these, polymer dispersants are preferably used.

The pigment dispersant is preferably contained by a mass ratio of from 0.2 to 1.0 by a total amount.

The incorporation amount of the pigment dispersant in the total amount of the ink is preferably from 1 to 15% by mass, more preferably from 2 to 10% by mass.

Besides the above-mentioned pigment dispersants, an acrylic resin having a functional group that can be reacted with an amine can be used. As an example thereof, the method for synthesizing acrylic resin A is shown below, but the acrylic resin is not limited to the following example.

(Synthesis of Acrylic Resin A)

AF Solvent No. 6 (naphthene-based solvent; manufactured by JX Nippon Oil & Energy Corporation) is charged in a four-necked flask, the flask is aerated with nitrogen gas, and the temperature is raised to 110° C. under stirring. Subsequently, a mixture of each of the monomer compositions having the compositions shown in Table 1, AF Solvent No. 6 and Perbutyl O (t-butylperoxy-2-ethylhexanoate; manufactured by NOF Corporation) is added dropwise over 3 hours, while the temperature was maintained at 110° C. Subsequently, Perbutyl O was added at after 1 hour and 2 hours while the temperature is retained at 110° C. Furthermore, aging is conducted at 110° C. for 1 hour, and the product is diluted with AF Solvent No. 6, whereby a solution of colorless, transparent resin solution with 50% of a non-volatile component is obtained.

In acrylic resin A obtained as above, the functional groups that can be reacted with an amine are the glycidyl group of GMA, and the β-diketone group of AAEM.

TABLE 1

| Resin solution | | | |
|---|---|---|---|
| Monomer mixture | VMA (C22) | Behenyl methacrylate (manufactured by NOF Corporation) | 50 |
| | LMA (C12) | Dodecyl methacrylate (manufactured by Kao Corporation) | 15 |
| | AAEM | Acetacetoxyethyl methacrylate (manufactured by Nippon Synthetic Chemical Industry Co., Ltd.) | 30 |
| | GMA | Glycidyl methacrylate (manufactured by NOF Corporation) | 5 |

(% by mass)

Furthermore, in the present invention, since either of the non-aqueous pigment ink and the post-treatment liquid contains the water-soluble resin having an amino group, there is also a case where the non-aqueous pigment ink contains the water-soluble resin, and such case will be mentioned below.

The non-aqueous pigment ink in the present invention may contain conventionally-used additives besides the above-mentioned respective components. Examples of the additives include surfactants such as anionic, cationic, amphoteric or nonionic surfactants, and antioxidants such as dibutylhydroxytoluene, propyl pyrogallate, tocopherol, butylhydroxyanisole and nordihydroguaiaretic acid.

The suitable scope of the viscosity of the ink differs depending on the nozzle diameter of an ejection head, an ejection environment, and the like in the case of use in an inkjet recording system, and generally, the viscosity is preferably from 5 to 30 mPa·s at 23° C., more preferably from 5 to 15 mPa·s, and about 10 mPa·s is suitable for use in an inkjet recording apparatus. The viscosity herein represents a value at 10 Pa when a shear stress increased from 0 Pa at a velocity of 0.1 Pa/s at 23° C.

The method for preparing the non-aqueous pigment ink is not especially limited, and the non-aqueous pigment ink can be prepared by mixing the non-aqueous solvent with the pigment, and other components as necessary.

[Post-Treatment Liquid]

The post-treatment liquid in the present invention contains at least silica and an organic solvent, and also contains a water-soluble resin, a pigment dispersant (non-aqueous resin) and the like as necessary.

(Silica)

The silica is not especially limited, and powder silica, colloidal silica, and synthetic amorphous silica and the like can be respectively used singly, or in combination. As the powder silica, AEROSIL 90 and OX 50 manufactured by Nippon Aerosil Co., Ltd., E-200A, E-220A, K-500, E-1009, E-1011, E-1030, E-150J and E-170 manufactured by Tosoh Silica Corporation, and the like can be used. As the colloidal silica, for example, Snowtex S, OS, XS, OXS, 20, 30, 40, 50, O, AK, AK-YL, O-40, CM, 20L, C, ZL, XL, N and UP manufactured by Nissan Chemical Industries, Ltd., Quartron PL-1, PL-3, PL-7 and PL-20 manufactured by Fuso Chemical Co., Ltd., Silicaloid, Silicaloid-LL and Silicaloid-A manufactured by Sanko Colloid Chemical Co., Ltd., and the like can be used. The synthetic amorphous silicas are formed by a neutralization reaction between a silicate and an acid, and can be classified into various properties depending on the production methods thereof, and for example, Mizukasil P-73, P-78A, P-707, P-709, P-527 and P-803 manufactured by Mizusawa Industrial Chemicals, Ltd. and the like can be used.

The average particle diameter of the silica is preferably from 10 to 400 nm, more preferably from 15 to 300 nm, and further preferably from 25 to 200 nm. Since the average particle diameter is within this range, strike through can further be decreased, and thus a high printing density can be obtained. The average particle diameter of the silica is a value on a volume basis measured by a dynamic light scattering particle size distribution analyzerLB-500 manufactured by Horiba, Ltd.

The content of the silica in the post-treatment agent liquid is preferably 1 to 20% by mass, more preferably 5 to 20% by mass in terms of solid content. Since the content is 1% by mass or more, effects of decreasing strike through and improving printing density can be sufficiently obtained. From the viewpoints of prevention of the irregular reflection of light on the recording medium and the dispersion stability of the inorganic particles in the post-treatment agent, the content is preferably 20% by mass or less.

(Organic Solvent and Pigment Dispersant)

As the organic solvent and pigment dispersant used in the post-treatment liquid, those similar to the non-aqueous solvent and pigment dispersant used in the non-aqueous pigment ink can be used, and preferable examples thereof are also similar.

On the other hand, if the pigment dispersant is used in the post-treatment liquid, there is a fear that the silica easily permeates into the printing medium to thereby prevent the improvement of the image density. Therefore, it is preferable to ensure dispersion stability without using a pigment dispersant, and in order to do so, it is preferable to use a glycol ether-based solvent as an organic solvent. In the case where a pigment dispersant is not used in the post-treatment liquid, it is considered that the silica does not follow the glycol ether-based solvent, and becomes difficult to permeate in the printing medium. It is considered that the silica easily remains on the surface of the printing medium by this way, and the printing density can be improved more than that in a post-treatment liquid using a pigment dispersant, even the content ratio of the silica is the same.

Furthermore, since no pigment dispersant is used, the silica easily flocculates one another during the leaving of the solvent that occurs after the landing of the ink droplets. Accordingly, it is considered that a silica sol using no pigment dispersant is thickened rapidly in accordance with the leaving of the solvent as compared to a system using a pigment dispersant. It is considered that, since the whole system is thickened rapidly, the glycol ether-based solvent does not permeate deep inside of the printing medium, and thus the strike through is difficult to deteriorate even the printing density is improved. Therefore, abrasion resistance, prevention of strike through, and intermittent ejection property can be ensured by using the glycol ether-based solvent as an organic solvent.

Preferable glycol ether-based solvents include those in the scopes represented by:

$$C_xH_{x+2}O(C_2H_4O)_YH \quad (1 \leq X \leq 4, 2 \leq Y \leq 4) \tag{a}$$

$$C_PH_{P+2}O(C_2H_4O)_R C_QH_{Q+2} \quad (1 \leq P \leq 4, 1 \leq Q \leq 4, 2 \leq R \leq 4). \tag{b}$$

If a glycol ether-based solvent that goes beyond these scopes is used, the inkjet ink may become unpreferable as an inkjet ink since the boiling point becomes too low and thus the intermittent ejection property is deteriorated, and the viscosity becomes too high.

In addition, where necessary, the post-treatment liquid can suitably contain an antioxidant, an antiseptic agent and the like.

Furthermore, since either of the non-aqueous pigment ink and the post-treatment liquid contains the water-soluble resin having an amino group in the present invention, there is also a case where the post-treatment liquid contains the water-soluble resin, and such case will be mentioned below.

The method for preparing the post-treatment liquid is not especially limited, and the post-treatment liquid can be prepared by mixing silica, and other components as necessary with an organic solvent.

(Water-Soluble Resin Having Amino Group)

In the present invention, either of the non-aqueous pigment ink and the post-treatment liquid contains a water-soluble resin having an amino group.

The present invention intends to prevent the bleeding and strike through of the pigment and silica by adding the water-soluble resin having an amino group to either of the non-aqueous pigment ink and the post-treatment liquid. For example, in the non-aqueous ink, it is conjectured that the elution of the pigment together with the non-aqueous solvent is blocked by the bonding of the substituent (acidic substituents such as carboxylic acid, sulfonic acid and the like) on the surface of the pigment and the amino group of the water-soluble resin having an amino group, and that the bleeding and strike through are strongly suppressed by printing with the post-treatment liquid. Similarly, in the post-treatment liquid, it is conjectured that the bleeding and strike through of the silica instead of the pigment are suppressed, and thus the bleeding of the pigment is strongly suppressed.

Examples of the water-soluble resin having an amino group can include basic polymer electrolytes or derivatives thereof such as polyethyleneimine (PEI), polyvinylamine and polyvinylpyridine, and especially, polyethyleneimines having a weight average molecular weight of from 200 to 2,000, or modified polyethyleneimines obtained by an addition reaction of a polyethyleneimine having a weight average molecular weight of from 200 to 2,000 with either of an acrylic acid ester or a vinyl compound can be preferably used. The modified polyethyleneimines are preferably those having a ratio to the acrylic acid ester or vinyl compound of 0.3 molar equivalent amount or more and lower than 1 molar equivalent amount in the case where the total amine value of the polyethyleneimine is 1 molar equivalent amount (hereinafter simply referred to as a modified polyethyleneimine). The amine value as used herein is calculated by obtaining an amine value (KOH mg/g) by (2) Indicator Titration Method of JIS K-7237-1995 (Method for testing total amine value of amine curing agent for epoxy resin), and converting the amine value with the molecular weight of KOH: 56.11 mg/mmol.

When the weight average molecular weight of the polyethyleneimine is lower than 200, the effect of increasing densities against plain paper is low, whereas when the weight average molecular weight is 2,000 or more, the storage stability may be deteriorated depending on the storage environments. The weight average molecular weight of the polyethyleneimine is more preferably from 300 to 1,800, since the effect of increasing densities is high, and the pour point is −5° C. or less and the storage stability at low temperatures is fine.

It is possible to use a commercially available polyethyleneimine, and preferable examples can include SP-006, SP-012, SP-018 and SP-200 manufactured by Nippon Shokubai Co., Ltd.; and Lupasol FG, Lupasol G20 Waterfree and Lupasol PR8515 manufactured by BASF, and the like.

The content ratio of the water-soluble resin having an amino group is preferably from 0.2 to 10% by mass, more preferably from 1 to 5% by mass for either of the non-aqueous pigment ink and the post-treatment liquid.

<Inkjet Printing Method>

In the non-aqueous inkjet printing method of the present invention, the above-mentioned non-aqueous pigment ink and the post-treatment liquid are used. Furthermore, the present invention includes the steps of ejecting droplets of the non-aqueous pigment ink onto a surface of a printing medium to form dots composed of the non-aqueous pigment ink, and then ejecting droplets of a post-treatment liquid containing at least silica and an organic solvent toward the printing medium so that the droplets overlap with the dots composed of the non-aqueous pigment ink. In the present invention, "overlap" in the above-mentioned " . . . toward the printing medium so that . . . overlap with the dots . . . " means that at least a part overlaps.

Furthermore, in the present invention, either of the non-aqueous pigment ink and the post-treatment liquid contains a water-soluble resin having an amino group, and an embodiment in which the non-aqueous pigment ink contains the water-soluble resin is referred to as a first embodiment, and an embodiment in which the post-treatment liquid contains the water-soluble resin is referred to as a second embodiment.

In either of the embodiments, the printing density is improved by the mixing of the pigment, silica and water-soluble resin on the printing medium after the above-mentioned steps, and the mechanism thereof is conjectured as follows.

In the first embodiment, when the non-aqueous pigment ink dispersed with the water-soluble resin having an amino group is printed, and the post-treatment liquid is then printed, the ink and the post-treatment liquid are mixed, and the remaining amine group in the water-soluble resin existing on the surface of the pigment binds to the hydroxyl group on the surface of the silica. Furthermore, it is considered that, since the dispersion stability of the pigment and silica is deteriorated and the pigment and silica flocculate in due course, the pigment and silica easily remain on the surface of paper, and thus the printing density is improved. Also in the second embodiment, it is considered that, since the non-aqueous pigment ink and the post-treatment liquid are mixed after the printing, the printing density is improved by a similar mechanism to that of the first embodiment.

In a state where the water-soluble resin is not adsorbed by the pigment or silica, the water-soluble resin cannot present homogeneously in the non-aqueous solvent. However, since the pigment and silica have slight hydrophilic substituents (a carboxylic acid group and the like), the water-soluble resin can be adsorbed by kneading by a dispersion machine or the like. Therefore, the water-soluble resin becomes possible to homogeneously present in the non-aqueous pigment ink or post-treatment liquid, and thus the pigment and the silica can be efficiently bound even within a short time before the permeation immediately after the landing, and thus an effect of improving a printing density is exerted.

In the present invention, as mentioned above, the droplets of the post-treatment liquid are ejected toward the printing medium so that the droplets overlap with the dots composed of the non-aqueous pigment ink, and the ratio of the non-aqueous pigment ink droplet to the droplets of the post-treatment liquid is preferably from 95:5 to 50:50, more preferably from 90:10 to 75:25 by a volume ratio.

In the present invention, the time from the formation of the dots composed of the non-aqueous pigment ink to the landing of the droplets of the post-treatment liquid so that the droplets overlap with the dots composed of the non-aqueous pigment ink is preferably from 0.01 second or more, more preferably from 0.03 seconds or more.

In order to allow the overlapping of the droplets of the post-treatment liquid with the dots composed of the non-aqueous pigment ink, it is preferable to (1) form plural rows of dots composed of the non-aqueous pigment ink on the surface of the printing medium, and eject the post-treatment liquid so that the droplets of the post-treatment liquid land on the respective dots of the non-aqueous pigment ink, or to (2) form plural rows of dots composed of the non-aqueous pigment ink on the surface of the printing medium, and eject the post-treatment liquid so that the droplets of the post-treatment liquid land on the gaps of the adjacent dots of the non-aqueous pigment ink. In either of these embodiments of (1) and (2), the printing density can be improved by incorporating the water-soluble resin having an amino group in either of the non-aqueous pigment ink and the post-treatment liquid.

Figure 1:
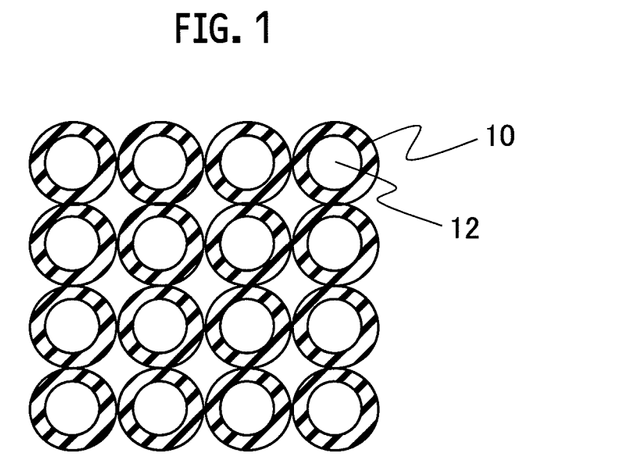
FIG. 1 is a plane view that schematically shows a state in which droplets of a post-treatment liquid have landed on dots of a non-aqueous pigment ink.

FIG. 1 schematically shows the aspect in which printing is conducted by using the non-aqueous pigment ink and the post-treatment liquid by the embodiment of the above-mentioned (1). Specifically, FIG. 1 shows an aspect in which droplets 12 of the post-treatment liquid have landed on the respective dots of the rows of dots 10 that are formed of the non-aqueous pigment ink. In order to allow the landing of the respective droplets in such way, it is only necessary to control so that the droplets of the post-treatment liquid land on the same positions as those of the droplets of the non-aqueous pigment ink after the landing of the droplets of the non-aqueous pigment ink on the printing medium. For example, it is necessary to dispose a nozzle that is configured to eject the non-aqueous pigment ink and a nozzle that is configured to eject the post-treatment liquid in an inkjet printer, and to preset the disposition of the respective nozzles, the mechanism of the transportation of the printing medium, and the scanning mechanism of the inkjet head, and the like so that the droplets of the post-treatment liquid are ejected after the ejection of the droplets of the non-aqueous pigment ink. Such controlling method is well-known in inkjet printers.

Figure 2:
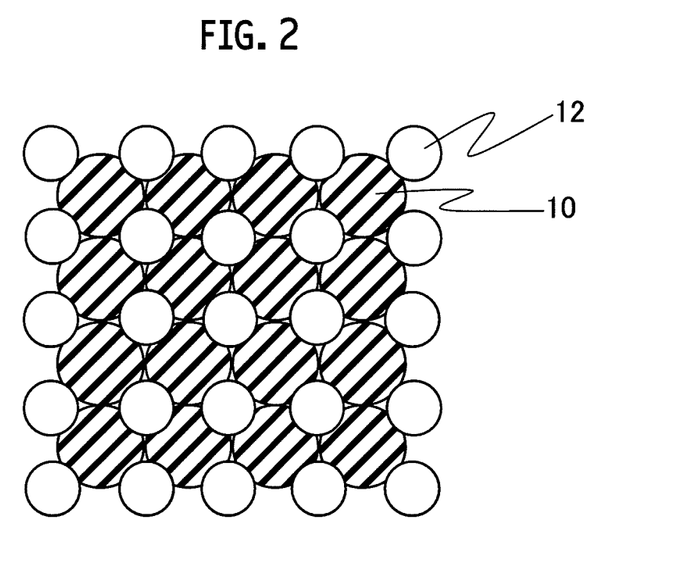
FIG. 2 is a plane view that schematically shows a state in which droplets of a post-treatment liquid have landed on gaps between adjacent dots of a non-aqueous pigment ink.

On the other hand, FIG. 2 schematically shows an aspect after the printing has been conducted by using the non-aqueous pigment ink and the post-treatment liquid by the embodiment of the above-mentioned (2). Specifically, FIG. 2 shows an aspect in which the droplets of post-treatment liquid 12 have landed on the gaps of the adjacent dots of the non-aqueous pigment ink in the plural rows of dots 10 formed of the non-aqueous pigment ink. The means for allowing the landing of the droplets of the post-treatment liquid on the gaps of the adjacent dots of the non-aqueous pigment ink in this way is not especially limited, and for example, the following means is exemplified.

Figure 3:
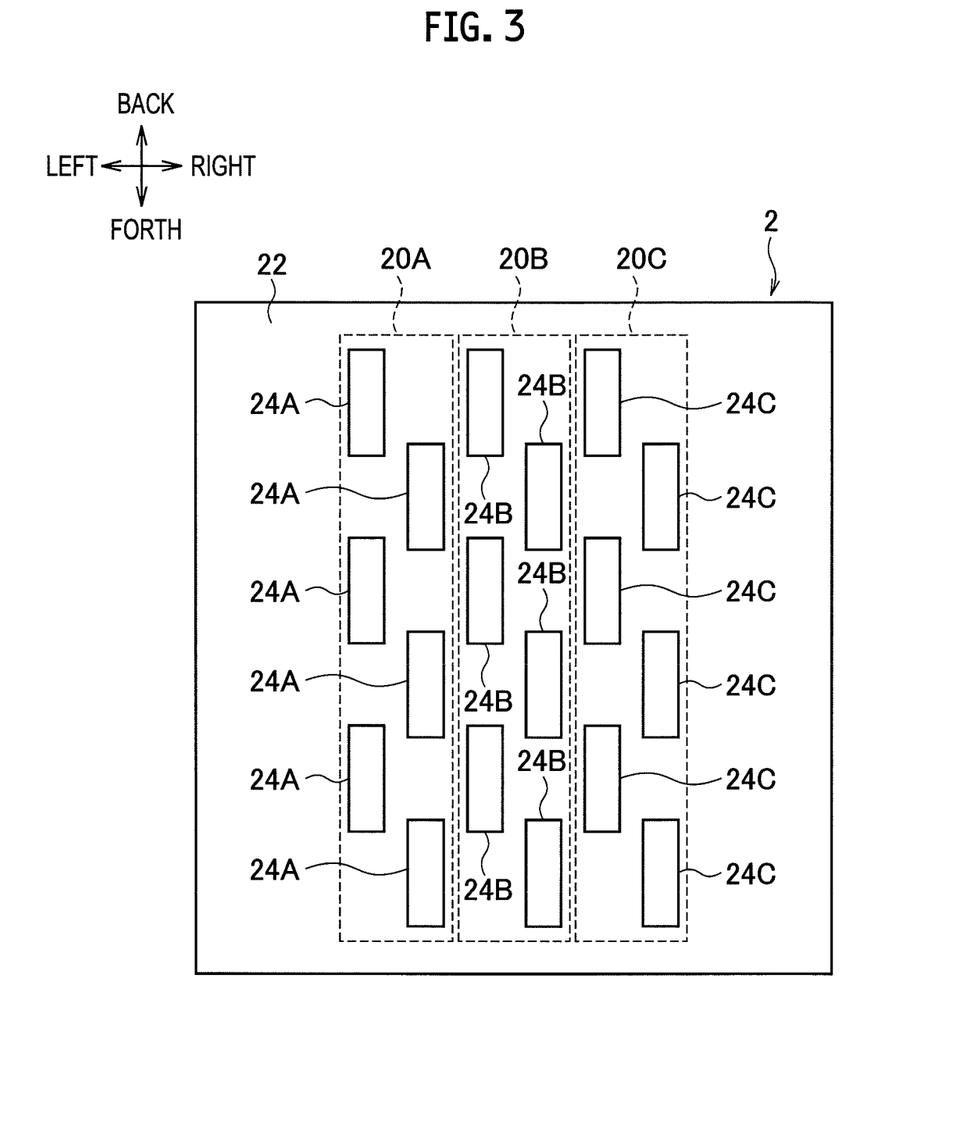
FIG. 3 is a plane view of an inkjet head of a line-type inkjet printer.

FIG. 3 is a plane view showing a transportation unit of a line-type inkjet printer. In transportation unit 2, transportation belt 22 that is configured to transport a printing medium by transferring the printing medium in the right and left direction of the plane of paper in FIG. 3, and inkjet heads 20A to 20C that are configured to eject inks and the like onto the transferred printing medium, which are disposed on the upper side of a transportation belt. The inkjet heads 20A to 20C have plural nozzles that are configured to eject droplets of inks or post-treatment liquids toward the printing medium.

Specifically, the inkjet head 20A has plural head units 24A. In the example shown in FIG. 3, the inkjet head 20A is constituted by six head units 24A. The six head units 24A are disposed in a staggered manner. More specifically, the six head units 24A are arranged in the direction (back and forth direction) that is approximately orthogonal to the transportation direction (right and left direction) of the paper (printing medium), and are alternately arranged on staggered positions in the transportation direction. The inkjet head 20B is constituted by six head units 24B. The inkjet head 20C is constituted by six head units 24C. The six head units 24B and six head units 24C are disposed in a staggered manner as in the six head units 24A. The head units 24A to 24C are fixed on a head holder (not depicted). The head units 24A to 24C have similar constitutions except that the inks to be ejected are different as mentioned below.

In the following explanation, the inkjet heads 20A to 20C, the subscripts of alphabets (A to C) in the symbols of the head units 24A to 24C are sometimes abbreviated, and the inkjet heads are generally described.

Figure 4:
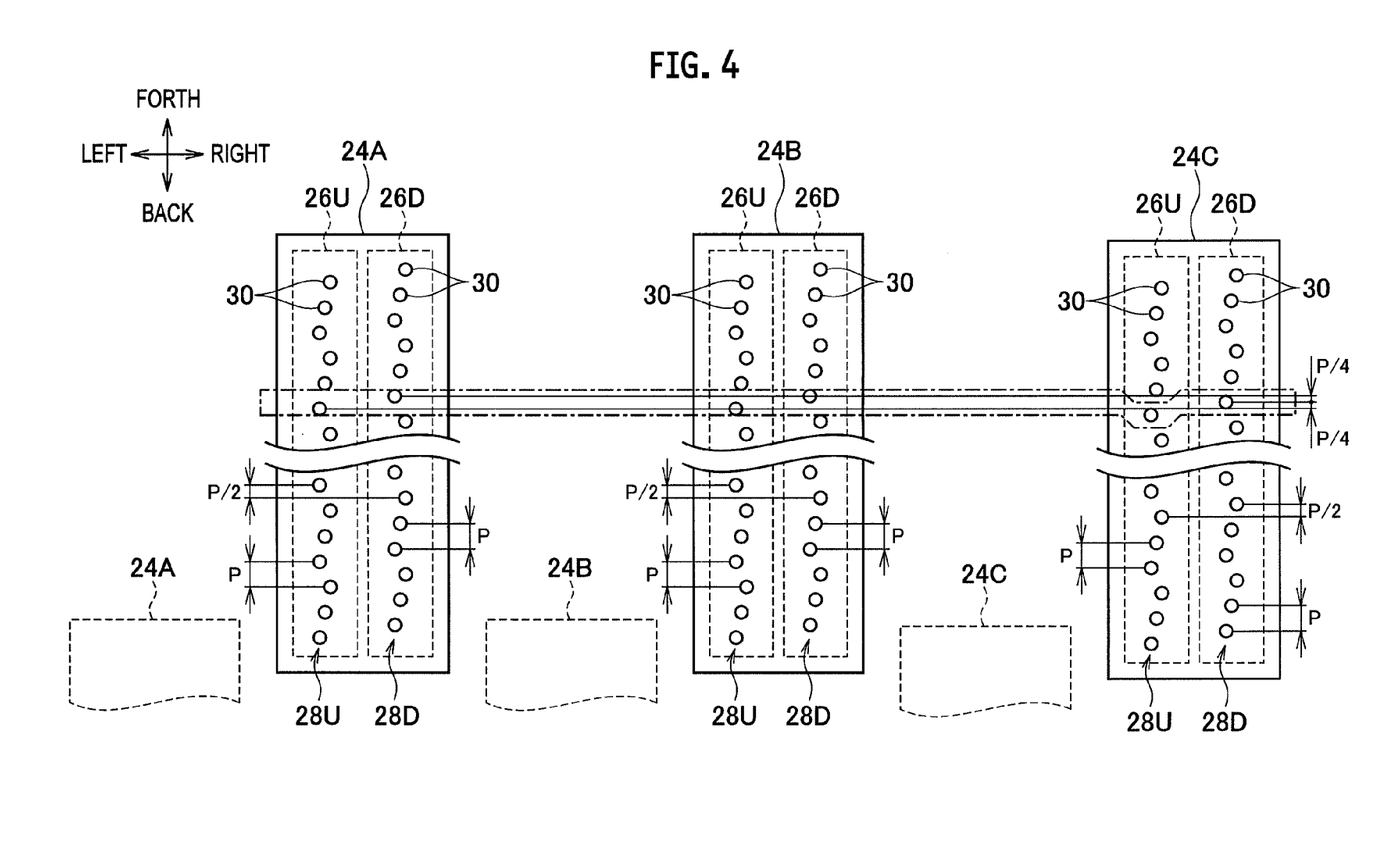
FIG. 4 is a schematic constitutional drawing of a part of a head unit positioned in the head unit shown in FIG. 3.

As shown in FIG. 4, the head unit 24 has two ink chambers 26U and 26D and two nozzle rows 28U and 28D. FIG. 4 is a drawing in which the head units 24A to 24C on the same row along the right and left direction are seen from below. The subscripts of alphabets (U and D) in the ink chambers 26U and 26D and the nozzle rows 28U and 28D are sometimes abbreviated, and the ink chambers and nozzle rows are generally represented.

The ink chamber 26 stores a non-aqueous pigment ink or a post-treatment liquid. An ink is fed to the ink chamber 26 through an ink pathway (not depicted). A piezo element (not depicted) is disposed in the ink chamber 26. The ink is ejected from nozzle 30, which will be mentioned below, by the driving of the piezo element.

A black color ink is fed to both the ink chambers 26U and 26D of the head unit 24A. A cyan color ink is fed to the ink chamber 26U of the head unit 24B. A magenta color ink is fed to the ink chamber 26D of the head unit 24B. A yellow color ink is fed to the ink chamber 26U of the head unit 24C. The post-treatment liquid in the present invention is fed to the ink chamber 26D of the head unit 24C.

Nozzle row 28 is composed of plural nozzles 30 that are configured to eject inks. In each nozzle row 28, the nozzles 30 are disposed at equal intervals at a predetermined pitch P in the main scanning direction (back and forth direction). Nozzle row 28U at the upper stream side and nozzle row 28D at the downstream side are disposed in parallel in the transportation direction (right and left direction) of paper. Furthermore, the nozzles 30 of the nozzle row 28U and the nozzles 30 of the nozzle row 28D are disposed so as to be staggered by a half pitch (P/2) in the main scanning direction.

The nozzle rows 28U and 28D of the head unit 24A eject a black color ink to be fed to the ink chambers 26U and 26D of the head unit 24A. By ejecting the black color ink from the two rows of the nozzle rows 28U and 28D, the printing resolution of black can be increased more than those of other colors. The nozzle rows 28U and 28D of the head unit 24B respectively eject cyan and magenta color inks to be fed to the ink chambers 26U and 26D of the head unit 24B. The nozzle rows 28U and 28D of the head unit 24C respectively eject a yellow color ink and a post-treatment liquid to be fed to the ink chambers 26U and 26D of the head unit 24C.

The head unit 24A and the head unit 24B are disposed so that the respective nozzle positions in the main scanning direction are identical. Specifically, the nozzle row 28U of the head unit 24A and the nozzle row 28U of the head unit 24B are identical in the position of the respective nozzles 30 in the main scanning direction. Furthermore, the nozzle row 28D of the head unit 24A and the nozzle row 28D of the head unit 24B are identical in the positions of the respective nozzles 30 in the main scanning direction.

On the other hand, the head unit 24C is disposed so that the center positions of the four nozzles 30 that correspond to the same pixels (dots) in the nozzle rows 28U and 28D of the head units 24A and 24B in the main scanning direction and the center positions of the nozzles 30 that correspond to the above-mentioned pixels of the nozzle row 28D of the head unit 24C in the main scanning direction are identical. As used herein, the center positions of the four nozzles 30 that correspond to the same pixels in the nozzle rows 28U and 28D of the head units 24A and 24B in the main scanning direction have the same meaning as the center positions of pixels formed on paper by inks ejected from these four nozzles 30 in the main scanning direction. Furthermore, the center position of the nozzles 30 that correspond to the above-mentioned pixels of the nozzle row 28D of the head unit 24C in the main scanning direction have the same meaning as the center positions of the pixels formed on paper by inks ejected from the above-mentioned nozzles 30. Furthermore, "identical" is not limited to complete identical, and also includes a variation within a predetermined range. This predetermined range can be determined, for example, by an experimental means.

The combination of the nozzles 30 that correspond to the same pixels in the head units 24A to 24C is shown by surrounding by a dash line in FIG. 4.

In the head units 24A and 24B, the nozzles 30 of the nozzle row 28U and the nozzles 30 of the nozzle row 28D, which correspond to the same pixels, are staggered by a half pitch (P/2) in the main scanning direction. Furthermore, in the nozzle row 28U of the head unit 24A and the nozzle row 28U of the head unit 24B, the positions of the nozzles 30 that correspond to the same pixel in the main scanning direction are identical. Furthermore, in the nozzle row 28D of the head unit 24A and the nozzle row 28D of the head unit 24B, the positions of the nozzles 30 that correspond to the same pixels in the main scanning direction are identical.

Accordingly, the center positions of the four nozzles 30 that correspond to the same pixels in the head units 24A and 24B in the main scanning direction are the intermediate positions of the nozzles 30 of the nozzle row 28U and the nozzle 30 of the nozzle row 28D that correspond to the same pixels in the main scanning direction.

Accordingly, as shown in FIG. 4, the head unit 24C is disposed so that the center positions of the nozzles 30 of the nozzle row 28D of the head unit 24C corresponds to the intermediate positions of the nozzles 30 of the nozzle row 28U and the nozzles 30 of the nozzle row 28D of the head units 24A and 24B that correspond to the same pixels. Therefore, the pixels formed by the droplets that are ejected from the nozzles 30 of the head unit 24C are in a staggered state by a half pitch in the main scanning direction with respect to the pixels formed by the droplets that are ejected from the nozzles 30 of the head units 24A and 24B.

By the above-mentioned constitution of the inkjet head, the pixels that are formed by the droplets of the post-treatment liquid are in a staggered state by a half pitch in the main scanning direction with respect to the pixels that are formed by the droplets of the non-aqueous pigment ink. Furthermore, in order to form the pixels that are formed by the droplets of the post-treatment liquid in the sub scanning direction in a staggered state by a half pitch with respect to the pixels that are formed by the droplets of the non-aqueous pigment ink, it is sufficient to control the timing of ejection so that the droplets of the post-treatment liquid land on the transported printing medium in a staggered state by a half pitch with respect to the pixels that are formed by the droplets of the non-aqueous pigment ink.

By printing in the above-mentioned way, the pixels are in a staged state by a half pitch in both the main scanning direction and the sub scanning direction, i.e., in a state where the droplets of the post-treatment liquid 12 have landed on the gaps between the adjacent dots of the non-aqueous pigment ink as shown in FIG. 2.

In either of the above-mentioned (1) and (2), in view of improvement of the printing density, the volume ratio of the droplets of the non-aqueous pigment ink and the droplets of the post-treatment liquid is preferably from 95:5 to 50:50, more preferably from 90:10 to 75:25.

The printing medium used in the present invention is not especially limited, and plain paper, high-quality plain paper, inkjet (IJ) paper, IJ matte paper, coated paper in which an ink-absorbing solution coats a recording medium, micro-coated paper having a thinner ink absorbing layer than that of coated paper, glossy paper (photo glossy paper), special paper, fabric or the like can be used.

EXAMPLES

Hereinafter the present invention will further be specifically explained by Examples, but the present invention is not limited to the following Examples.

Examples 1 to 9 and Comparative Examples 1 to 2

Preparation of Non-Aqueous Pigment Ink (Black Ink)

The respective components were mixed so as to give the components and incorporation rates (% by mass) shown in Table 2 and dispersed by a Dyno-Mill (manufactured by Shinmaru Enterprises Corporation) filled with zirconia beads (diameter: 0.5 mm) at a filling rate of 85% under a condition of a dwell time of 15 minutes, whereby non-aqueous pigment inks K-1 to K-5 were obtained.

The details of the respective components described in Table 2 are shown below.
Pigment: MA8 manufactured by Mitsubishi Chemical Corporation
Pigment dispersant: Solsperse 13940 manufactured by Lubrizol Japan
Petroleum-based hydrocarbon solvent: Isopar G manufactured by Tonen Gereral Sekiyu K.K.
Water-soluble cation polymers (polyethyleneimines);
  PEI 1: Epomin SP-003 manufactured by Nippon Shokubai Co., Ltd. (solid content 100%)
  PEI 2: Epomin SP-012 manufactured by Nippon Shokubai Co., Ltd. (solid content 100%)
  PEI 3: Epomin SP-200 manufactured by Nippon Shokubai Co., Ltd. (solid content 100%)
Water-soluble cation polymer (dimethylamine ammonia epichlorohydrin resin): Papiogen P-105 manufactured by Senka Corporation (solid content 60%)

TABLE 2

|  |  | Molecular weight | Non-aqueous dispersion liquid | | | | |
|---|---|---|---|---|---|---|---|
|  |  |  | K-1 | K-2 | K-3 | K-4 | K-5 |
| Pigment |  | — | 5.00 | 5.00 | 5.00 | 5.00 | 5.00 |
| Pigment dispersant |  | — | 7.50 | 7.50 | 7.50 | 7.50 | 7.50 |
| Petroleum-based hydrocarbon solvent |  | — | 85.50 | 85.50 | 85.50 | 84.17 | 87.50 |
| Water-soluble cation polymer Polyethyleneimine | PEI1 | 300 | 2.00 | — | — | — | — |
|  | PEI2 | 1200 | — | 2.00 | — | — | — |
|  | PEI3 | 10000 | — | — | 2.00 | — | — |
| Water-soluble cation polymer Dimethylamine ammonia epichlorohydrin resin |  | Not disclosed | — | — | — | 3.33 | — |
| Total |  |  | 100.00 | 100.00 | 100.00 | 100.00 | 100.00 |

(Preparation of Post-Treatment Liquid)

The respective components were mixed so as to give the components and incorporation rates (% by mass) shown in Table 3 and dispersed under the same conditions as those for the non-aqueous pigment ink, whereby post-treatment liquids S-1 to S-5 were obtained.

The details of the respective components described in Table 3 are shown below.

Silica;
Silica 1: Aerosil R104 manufactured by Nippon Aerosil Co., Ltd., (average particle diameter: 150±25 nm)
Silica 2: Aerosil R106 manufactured by Nippon Aerosil Co., Ltd., (average particle diameter: 250±30 nm)
Silica 3: Aerosil R202 manufactured by Nippon Aerosil Co., Ltd. (average particle diameter: 100±20 nm)
Pigment dispersant: Solsperse 13940 manufactured by Lubrizol Japan
Petroleum-based hydrocarbon solvent: Isopar G manufactured by Tonen Gereral Sekiyu K.K.
Water-soluble cation polymer (polyethyleneimine): Epomin SP-003 manufactured by Nippon Shokubai Co., Ltd. (solid content 100%)

"ORPHIS X9050" (manufactured by Riso Kagaku Corporation, a high-speed color printer that is an inkjet recording apparatus), and a solid image (print size: 150 mm×100 mm) was printed on plain paper. The used inkjet printer had a mechanism configured to form dots by ejecting droplets of a non-aqueous pigment ink and eject droplets of a post-treatment liquid so that the droplets overlap with the dots, and the above-mentioned solid image was printed by that mechanism. Furthermore, in the respective Examples and Comparative Examples, one droplet of each of the non-aqueous pigment inks and the post-treatment liquids had the transfer amount shown in Table 4.

(Evaluation)

The printing densitys (OD value) of the printing surface (top surface) of the printed product before and after the post-treatment were measured by Macbeth densitometer (RD920 manufactured by Macbeth). Furthermore, in the respective Examples and Comparative Examples, the surface density was evaluated according to the following evaluation criteria based on the obtained OD values. The results are shown in Table 4.

TABLE 3

|  |  | Average particle diameter [nm] | Post-treatment liquid | | | | |
|---|---|---|---|---|---|---|---|
|  |  |  | S-1 | S-2 | S-3 | S-4 | S-5 |
| Silica | Silica 1 | 150 ± 25 | 5.00 | — | — | 5.00 | — |
|  | Silica 2 | 250 ± 30 | — | 5.00 | — | — | — |
|  | Silica 3 | 100 ± 20 | — | — | 5.00 | — | — |
| Pigment dispersant |  | — | 7.50 | 7.50 | 7.50 | 7.50 | 7.50 |
| Petroleum-based hydrocarbon solvent |  | — | 87.50 | 87.50 | 87.50 | 85.50 | 92.50 |
| Water-soluble cation polymer Polyethyleneimine |  | — | — | — | — | 2.00 | — |
| Total |  |  | 100.00 | 100.00 | 100.00 | 100.00 | 100.00 |

In the respective Examples and Comparative Examples, as shown in Table 4, either of the non-aqueous pigment inks K-1 to K-5 and either of the post-treatment liquids S-1 to S-5 obtained as above were charged in an inkjet printer —Evaluation Criteria—
○: improved by +0.05 or more as compared to Comparative Example 1 (a level at which one can visually recognize that printing has turned black)
X: +0.05 or less as compared to Comparative Example 1

TABLE 4

|  |  | Example 1 | Example 2 | Example 3 | Example 4 | Example 5 | Example 6 |
|---|---|---|---|---|---|---|---|
| Non-aqueous pigment ink | | K-1 | K-2 | K-3 | K-4 | K-1 | K-1 |
| | Transfer amount(pl) | 30 | 30 | 30 | 30 | 30 | 30 |
| Post-treatment liquid | | S-1 | S-1 | S-1 | S-1 | S-2 | S-3 |
| | Transfer amount(pl) | 18 | 18 | 18 | 18 | 18 | 18 |
| Application amount of silica(g/m$^2$) | | $1.4 \times 10^{-7}$ | $1.4 \times 10^{-7}$ | $1.4 \times 10^{-7}$ | $1.4 \times 10^{-7}$ | $1.4 \times 10^{-7}$ | $1.4 \times 10^{-7}$ |
| Surface density | Before post-treatment | 1.08 | 1.10 | 1.08 | 1.12 | 1.07 | 1.08 |
| | After post-treatment | 1.01 | 1.02 | 1.01 | 1.03 | 1.01 | 1.01 |
| | Change in OD value before and after post-treatment | 0.07 | 0.08 | 0.07 | 0.09 | 0.06 | 0.07 |
| | Judgment | ○ | ○ | ○ | ○ | ○ | ○ |

|  |  | Example 7 | Example 8 | Example 9 | Comparative Example 1 | Comparative Example 2 |
|---|---|---|---|---|---|---|
| Non-aqueous pigment ink | | K-1 | K-1 | K-5 | K-5 | K-1 |
| | Transfer amount(pl) | 30 | 30 | 30 | 30 | 30 |
| Post-treatment liquid | | S-1 | S-1 | S-4 | S-1 | S-5 |
| | Transfer amount(pl) | 6 | 30 | 18 | 18 | 18 |
| Application amount of silica(g/m$^2$) | | $4.66 \times 10^{-6}$ | $2.33 \times 10^{-7}$ | $1.4 \times 10^{-7}$ | $1.4 \times 10^{-7}$ | $1.4 \times 10^{-7}$ |
| Surface density | Before post-treatment | 1.06 | 1.10 | 1.04 | 0.99 | 0.98 |
| | After post-treatment | 1.01 | 1.01 | 0.96 | 0.96 | 1.01 |
| | Change in OD value before and after post-treatment | 0.05 | 0.09 | 0.08 | 0.03 | −0.03 |
| | Judgment | ○ | ○ | ○ | x | x |

It is understood from Table 4 that the pigment, cationic polymer (water-soluble resin having an amino group) and silica are present in combination after the non-aqueous pigment ink and the post-treatment liquid have been mixed, and thus the surface density has been significantly improved, in either of Examples 1 to 9.

Examples 2 to 4 are respectively examples in which the kinds of the cationic polymers (water-soluble resins having an amino group) in the non-aqueous pigment inks are different, and it is understood that the surface density has been significantly improved even the kind of the cationic polymer has been changed.

Examples 5 and 6 are examples in which the kinds of the silica in the post-treatment liquid are different, and it is understood that the surface density has been significantly improved even the kind of the kind of the silica has been changed.

Examples 7 and 8 are examples in which the transfer amount of the post-treatment liquid is different, and it is understood that the surface density has been significantly improved when the transfer amount is from 6 to 30 pl.

Example 9 is an example in which the water-soluble resin having an amino group is incorporated in not the non-aqueous pigment ink but the post-treatment liquid unlike Examples 1 to 8, and it is understood that the surface density has been significantly improved also in Example 9.

Comparative Example 1 is an example in which the water-soluble resin having an amino group is not contained in either of the non-aqueous pigment ink and the post-treatment liquid, and it is understood that the surface density has not been improved.

Comparative Example 2 is an example in which silica is not contained in the post-treatment liquid, and it is understood that the surface density has decreased.

Examples 10 to 15 and Comparative Example 3

Preparation of Non-Aqueous Pigment Ink (Black Ink)

The non-aqueous pigment ink K-1, which was used in the above-mentioned Examples 1 and 5 to 8 and Comparative Example 2, was prepared.

(Preparation of Post-Treatment Liquids)

The respective components were mixed so as to give the components and incorporation rates (% by mass) shown in Table 5 and dispersed under the same conditions as those for the non-aqueous pigment ink, whereby post-treatment liquids S-6 to S-12 were obtained.

The details of the respective components described in Table 5 are shown below.

Silica;

Silica 4: Aerosil RX300 manufactured by Nippon Aerosil Co., Ltd. (average particle diameter: 180±30 nm)

"Silica 1" is Silica 1 used for the post-treatment liquid S-1 and the like.

Pigment dispersant: Solsperse 13940 manufactured by Lubrizol Japan

Glycol ether-based solvents;

Diethylene glycol monobutyl ether: manufactured by Tokyo Chemical Industry Co., Ltd.

Diethylene glycol dibutyl ether: manufactured by Tokyo Chemical Industry Co., Ltd.
Triethylene glycol monobutyl ether: manufactured by Tokyo Chemical Industry Co., Ltd.
Tetraethylene glycol dimethyl ether: manufactured by Tokyo Chemical Industry Co., Ltd.
Petroleum-based hydrocarbon solvent: Isopar G manufactured by Tonen General Sekiyu K.K.
Higher alcohol-based solvent: Risonol 18SP (isostearyl alcohol) manufactured by Kokyu Alcohol Kogyo Co., Ltd.
Water-soluble resin: polyethyleneimine SP-012 manufactured by Nippon Shokubai Co., Ltd.

—Evaluation Criteria—
OD value of top surface
A: The OD value of the top surface was improved by 0.05 to 0.1 with respect to that of Comparative Example 1.
B: The OD value of the top surface was improved by 0.01 to 0.04 with respect to that of Comparative Example 1.
C: The OD value of the top surface was equal to or decreased from that of Comparative Example 1.
OD value of rear surface
○: The OD of the rear surface was improved by 0.01 or more with respect to that of Comparative Example 1.

TABLE 5

| | | Post-treatment liquid | | | | | | |
|---|---|---|---|---|---|---|---|---|
| | | S-6 | S-7 | S-8 | S-9 | S-10 | S-11 | S-12 |
| Silica | Silica 1 | 5.0 | 5.0 | 5.0 | 5.0 | 5.0 | — | 5.0 |
| | Silica 4 | — | — | — | — | — | 5.0 | — |
| Pigment dispersant | Solsperse 13940 | — | — | — | — | — | — | 12.5 |
| Glycol ether solvent | Diethylene glycol monobutyl ether | 95.0 | — | — | — | 45.0 | 95.0 | — |
| | Diethylene glycol dibutyl ether | — | 95.0 | — | — | — | — | — |
| | Triethylene glycol monobutyl ether | — | — | 95.0 | — | 50.0 | — | — |
| | Tetraethylene glycol dimethyl ether | — | — | — | 95.0 | — | — | — |
| Petroleum-based hydrocarbon solvent | | — | — | — | — | — | — | 70.5 |
| Alcohol solvent | | — | — | — | — | — | — | 10.0 |
| Water-soluble resin | | — | — | — | — | — | — | 2.0 |
| Total | | 100.0 | 100.0 | 100.0 | 100.0 | 100.0 | 100.0 | 100.0 |

In the respective Examples and Comparative Examples, as shown in Table 6, the non-aqueous pigment ink K-1 and either of the post-treatment liquids S-6 to S-12 obtained as above were charged in an inkjet printer "ORPHIS X9050" (manufactured by Riso Kagaku Corporation), and a solid image (print size: 150 mm×100 mm) was printed on plain paper. The used inkjet printer had a mechanism configured to form dots by ejecting droplets of a non-aqueous pigment ink and eject droplets of a post-treatment liquid so that the droplets overlap with the dots, and the above-mentioned solid image was printed by that mechanism. Furthermore, in the respective Examples and Comparative Examples, one droplet of each of the non-aqueous pigment inks and the post-treatment liquids had the transfer amount shown in Table 6.
(Evaluation)
1. Printing Density
The printing densitys (OD values) of the printing surface (top surface) of the printed product before and after the post-treatment were measured by Macbeth densitometer (RD920 manufactured by Macbeth). Furthermore, in the respective Examples and Comparative Examples, the surface density was evaluated according to the following evaluation criteria based on the obtained OD value. The results are shown in Table 6.

X: The OD value of the rear surface was equal to or decreased from that of Comparative Example 1
2. Intermittent Ejection Property
Each ink was prepared, and the ink was introduced in an inkjet printer "ORPHIS X9050", printing was conducted under an environment of 35° C., the printer was left for 10 minutes, printing was conducted again, and the state of the printed product was evaluated under the following criteria.
—Evaluation Criteria—
○: Injection failure did not occur when the printer was left for 10 minutes after the printing and printing was conducted again.
X: Injection failure occurred when the printer was left for 10 minutes after the printing and printing was conducted again.
3. Abrasion Resistance
A cloth was attached to a crockmeter, the cloth was reciprocated five times on the surface of the printed product, and the degree of contamination on the cloth was visually evaluated according to the following evaluation criteria.
—Evaluation Criteria—
○: The pollution on the cloth and paper was lighter than or equal to that in Comparative Example 1.
X: The pollution on the cloth and paper was thicker than that in Comparative Example 1.

TABLE 6

|  |  | Example 10 | Example 11 | Example 12 | Example 13 | Example 14 | Example 15 | Comparative Example 3 |
|---|---|---|---|---|---|---|---|---|
| Non-aqueous pigment ink | Black ink(K) | K-1 | K-1 | K-1 | K-1 | K-1 | K-1 | K-1 |
|  | Transfer amount(pl) | 30 | 30 | 30 | 30 | 30 | 30 | 48 |
| Post-treatment liquid | Post-treatment liquid(S) | S-6 | S-7 | S-8 | S-9 | S-10 | S-11 | — |
|  | Transfer amount(pl) | 18 | 18 | 18 | 18 | 18 | 18 | 0 |
| Total transfer amount of ink and post-treatment liquid(pl) |  | 48 | 48 | 48 | 48 | 48 | 48 | 48 |
| Printing concentration (top surface OD) |  | A | A | A | A | A | B | C |
| Printing concentration (rear surface OD) |  | ○ | ○ | ○ | ○ | ○ | ○ | x |
| Intermittent ejection property |  | ○ | ○ | ○ | ○ | ○ | ○ | ○ |
| Scratch resistance |  | ○ | ○ | ○ | ○ | ○ | ○ | ○ |

From Table 6, in either of Examples 10 to 15, the organic solvent used for the post-treatment liquid contained a glycol ether-based solvent, and satisfiable evaluation results were able to be obtained in all of the printing density, intermittent ejection property and abrasion resistance. In contrast, Comparative Example 3 in which a post-treatment liquid itself was not used was poor in printing density.

Examples 16 to 18 and Comparative Examples 4 to 6

Preparation of Non-Aqueous Pigment Ink (Black Ink)

The non-aqueous pigment ink K-2, which was used in the above-mentioned Example 2, and the non-aqueous pigment ink K-5, which was used in the above-mentioned Example 9 and Comparative Example 1, were prepared.

(Preparation of Post-Treatment Liquid)

The post-treatment liquid S-1, which was used in the above-mentioned Examples 1 to 4 and the like, was prepared. Furthermore, respective components were mixed so as to give the components and incorporation rates (% by mass) shown in Table 7 and dispersed under the same conditions as that for the non-aqueous pigment ink, whereby post-treatment liquid S-13 was obtained.

The details of the respective components described in Table 7 are as follows.
Silica 5: Aerosil 150 manufactured by Nippon Aerosil Co., Ltd. (average particle diameter: 150±15 nm)
Pigment dispersant: Solsperse 27000 manufactured by Lubrizol Japan
Water-soluble solvent 1: glycerin
Water-soluble solvent 2: 3-methoxy-3-methyl-1-butanol Furthermore, the active ingredient of "Solsperse 27000", which was used as a pigment dispersant, is 100%. On the other hand, the active ingredient of "Solsperse 13940", which is the pigment dispersant contained by 7.50% by mass in the post-treatment liquid S-1, is 70%. Therefore, the silica/pigment dispersant ratios are the same between the post-treatment liquid S-13 and the post-treatment liquid S-1 in terms of active ingredient.

TABLE 7

|  |  | Average particle diameter [nm] | Post-treatment liquid S-13 |
|---|---|---|---|
| Silica | Silica 5 | 150 ± 15 | 5.0 |
| Pigment dispersant |  | — | 3.0 |
| Water-soluble solvent 1 |  | — | 12.0 |
| Water-soluble solvent 2 |  | — | 15.0 |
| Water |  | — | 65.0 |
| Total |  |  | 100.0 |

The non-aqueous pigment ink and the post-treatment liquid obtained as above were charged in an inkjet printer "ORPHIS X9050" (manufactured by Riso Kagaku Corporation), and a solid image (print size: 150 mm×100 mm) was printed on plain paper. The used inkjet printer had a mechanism configured to form dots by ejecting droplets of a non-aqueous pigment ink and eject droplets of a post-treatment liquid so that the droplets overlap with the dots, and the above-mentioned solid image was printed by that mechanism. Furthermore, in the respective Examples and Comparative Examples, the printing was conducted by ejecting the non-aqueous pigment ink and the post-treatment liquid as mentioned below. Specifically, in Examples 16 and 18, the printing was conducted in such a manner that dots composed of the non-aqueous pigment ink were formed and droplets of the post-treatment liquid land on the dots, and in Example 17 and Comparative Examples 5 and 6, the printing was conducted in such a manner that plural dots composed of the non-aqueous pigment ink are formed and droplets of the post-treatment liquid land on the gaps of the adjacent dots.

(Evaluation)

1. Printing Density

The printing surfaces (top surfaces) before and after the post-treatment of the printed product were measured by Macbeth densitometer (RD920 manufactured by Macbeth). The results are shown in Table 8.

2. Strike Through

The rear surfaces before and after the post-treatment of the printed product were measured by Macbeth densitometer (RD920 manufactured by Macbeth).

3. Transportation Property

The transportation property was evaluated by using an inkjet printer "ORPHIS X9050" (manufactured by Riso Kagaku Corporation). Using Riso thin paper (A4 size, manufactured by Riso Kagaku Corporation) as paper sheets, a solid image was printed on the entirety of one surface at a printing velocity of 120 sheets/min, and the transportation property was evaluated by the alignment of the ejected sheets after printing on 20 sheets. The case where no paper jam occurred and the alignment of the ejected sheets was fine was judged as "OK", and the case where a paper jam occurred or the ejected sheets were disturbed was judged as "NG".

TABLE 8

|  |  | Example 16 | Example 17 | Example 18 | Comparative Example 4 | Comparative Example 5 | Comparative Example 6 |
|---|---|---|---|---|---|---|---|
| Non-aqueous pigment ink | Black ink(K) | K-2 | K-2 | K-2 | K-5 | K-5 | K-2 |
|  | Transfer amount(pl) | 30 | 30 | 30 | 30 | 30 | 30 |
| Post-treatment liquid | Post-treatment liquid(S) | S-1 | S-1 | S-1 | — | S-1 | S-13 |
|  | Transfer amount(pl) | 18 | 18 | 18 | — | 18 | 18 |
| Total transfer amount of ink and post-treatment liquid(pl) |  | 48 | 48 | 48 | — | 48 | 48 |
| Dot position |  | On dots | Among dots | On dots | — | Among dots | Among dots |
| Order of droplet ejections |  | Ink → treatment liquid | Ink → treatment liquid | Ink → treatment liquid | — | Ink → treatment liquid | Ink → treatment liquid |
| Printing density |  | 1.10 | 1.13 | 1.13 | 0.96 | 0.93 | 1.02 |
| Strike through |  | 0.08 | 0.08 | 0.10 | 0.05 | 0.12 | 0.05 |
| Transportation property (sheet curling) |  | OK | OK | OK | OK | OK | NG |

From Table 8, either of Examples 16 to 18 was excellent in printing density, and strike through and curling were not observed.

In contrast, a sufficient printing density was not be able to be obtained in Comparative Example 4 in which a non-aqueous pigment ink containing no water-soluble resin having an amino group was used, and no post-treatment liquid was used. Furthermore, a sufficient printing density was not able to be obtained and strike through was observed in Comparative Example 5 in which a non-aqueous pigment ink containing no amino group was used. Furthermore, a curl was generated and the transportation property was poor in Comparative Example 6 in which a water-based post-treatment liquid was used.

What is claimed is:

1. A non-aqueous inkjet printing method comprising:
   ejecting first droplets of a non-aqueous pigment ink containing at least a pigment and a non-aqueous solvent onto a surface of a printing medium to form dots composed of the non-aqueous pigment ink, and then
   ejecting second droplets of a non-aqueous post-treatment liquid containing at least silica and an organic solvent toward the printing medium so that the second droplets overlap with the dots composed of the non-aqueous pigment ink,
   wherein either of the non-aqueous pigment ink and the post-treatment liquid contains a water-soluble resin having an amino group;
   wherein the non-aqueous solvent consists of a petroleum-based hydrocarbon solvent.

2. The non-aqueous inkjet printing method according to claim 1, wherein the organic solvent in the post-treatment liquid contains a glycol ether-based solvent.

3. The non-aqueous inkjet printing method according to claim 1, wherein
   the dots composed of the non-aqueous pigment ink are formed on the surface of the printing medium in plural rows, and
   the post-treatment liquid is ejected so that the second droplets of the post-treatment liquid land on the respective dots of the non-aqueous pigment ink.

4. The non-aqueous inkjet printing method according to claim 2, wherein
   the dots composed of the non-aqueous pigment ink are formed on the surface of the printing medium in plural rows, and
   the post-treatment liquid is ejected so that the second droplets of the post-treatment liquid land on the respective dots of the non-aqueous pigment ink.

5. The non-aqueous inkjet printing method according to claim 1, wherein
   the dots composed of the non-aqueous pigment ink are formed on the surface of the printing medium in plural rows having gaps between adjacent dots, and
   the post-treatment liquid is ejected so that the second droplets of the post-treatment liquid land on the gaps between the adjacent dots of the non-aqueous pigment ink.

6. The non-aqueous inkjet printing method according to claim 2, wherein
   the dots composed of the non-aqueous pigment ink are formed on the surface of the printing medium in plural rows having gaps between adjacent dots, and
   the post-treatment liquid is ejected so that the second droplets of the post-treatment liquid land on the gaps between the adjacent dots of the non-aqueous pigment ink.

7. The non-aqueous inkjet printing method according to claim 1, wherein the non-aqueous pigment ink contains the water-soluble resin having an amino group.

8. The non-aqueous inkjet printing method according to claim 2, wherein the non-aqueous pigment ink contains the water-soluble resin having an amino group.

9. The non-aqueous inkjet printing method according to claim 1, wherein the post-treatment liquid contains the water-soluble resin having an amino group.

10. The non-aqueous inkjet printing method according to claim 2, wherein the post-treatment liquid contains the water-soluble resin having an amino group.

11. The non-aqueous inkjet printing method according to claim 1, wherein a ratio of the non-aqueous pigment ink droplets to the droplets of the post-treatment liquid is from 95:5 to 50:50 by a volume ratio.

12. The non-aqueous inkjet printing method according to claim 1, wherein the water-soluble resin having an amino group comprises at least one selected from the group consisting of polyethyleneimine, a derivative of polyethyleneimine, polyvinylamine, a derivative of polyvinylamine, polyvinylpyridine, a derivative of polyvinylpyridine, and a dimethylamine ammonia epichlorohydrin resin.

13. The non-aqueous inkjet printing method according to claim 1, wherein the pigment contained in the non-aqueous pigment ink comprises at least one selected from the group consisting of organic pigment, carbon black, and titanium oxide.

14. The non-aqueous inkjet printing method according to claim 1, wherein the pigment comprises at least one selected from the group consisting of organic pigment and carbon black.

15. The non-aqueous inkjet printing method according to claim 1, wherein the non-aqueous pigment ink further comprises a polar organic solvent.

* * * * *